(12) United States Patent
Nagai et al.

(10) Patent No.: US 8,038,069 B2
(45) Date of Patent: Oct. 18, 2011

(54) APPARATUS FOR PRODUCING RFID LABELS

(75) Inventors: Takuya Nagai, Nagoya (JP); Yoshinori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 730 days.

(21) Appl. No.: 12/052,526

(22) Filed: Mar. 20, 2008

(65) Prior Publication Data

US 2008/0251009 A1 Oct. 16, 2008

(30) Foreign Application Priority Data

Mar. 23, 2007 (JP) ................................. 2007-077698

(51) Int. Cl.
*G06K 19/06* (2006.01)
(52) U.S. Cl. ........ 235/492; 118/35; 118/500; 340/572.1
(58) Field of Classification Search .................. 235/492; 340/572.1; 118/35, 500
See application file for complete search history.

(56) References Cited

U.S. PATENT DOCUMENTS

| 7,398,926 | B1* | 7/2008 | Kikin et al. | .................... | 235/451 |
| 2005/0040934 | A1* | 2/2005 | Shanton | ........................ | 340/5.92 |
| 2005/0280537 | A1* | 12/2005 | Feltz et al. | .................. | 340/572.1 |
| 2006/0220859 | A1* | 10/2006 | Nagai et al. | .................. | 340/572.1 |
| 2007/0120670 | A1* | 5/2007 | Torchalski | .................. | 340/572.1 |
| 2009/0002746 | A1 | 1/2009 | Niwa et al. | | |

FOREIGN PATENT DOCUMENTS

| JP | H09-251520 A | 9/1997 |
| JP | H11-184989 A | 7/1999 |
| JP | 2005-166834 A | 6/2005 |
| JP | 2005-190064 A | 7/2005 |
| JP | 20051865670 A | 7/2005 |
| JP | 2005298100 A | 10/2005 |
| JP | 2005-343103 A | 12/2005 |
| JP | 2006-079263 A | 3/2006 |
| JP | 2006-309557 A | 11/2006 |

OTHER PUBLICATIONS

Japan Patent Office; Notice of Reasons for Rejection in Japanese Patent Application No. 2007-077698 (counterpart to the above-captioned U.S. patent application) mailed Jul. 23, 2009.

* cited by examiner

*Primary Examiner* — Daniel Hess
*Assistant Examiner* — Rafferty Kelly
(74) *Attorney, Agent, or Firm* — Baker Botts L.L.P.

(57) ABSTRACT

An apparatus for producing RFID labels includes: a housing forming a shell of the apparatus; a feeding roller drive shaft configured to feed a base tape in which a RFID circuit element for producing a label provided with an IC circuit part storing information and a tag antenna for transmission and reception of information is arranged; an antenna for producing the label provided in the housing and configured to transmit and receive the information via radio communication with respect to the RFID circuit element for producing a label in a tag label tape with print; an antenna for acquiring information provided with the IC circuit part storing information and the tag antenna for transmission and reception of information and configured to transmit and receive the information via the radio communication with a RFID circuit element for acquiring information located outside the housing; and a shielding member provided so as to cover at least the side of the antenna for acquiring information of the antenna for producing a label and provided with a function to shield or attenuate an electromagnetic wave.

2 Claims, 16 Drawing Sheets

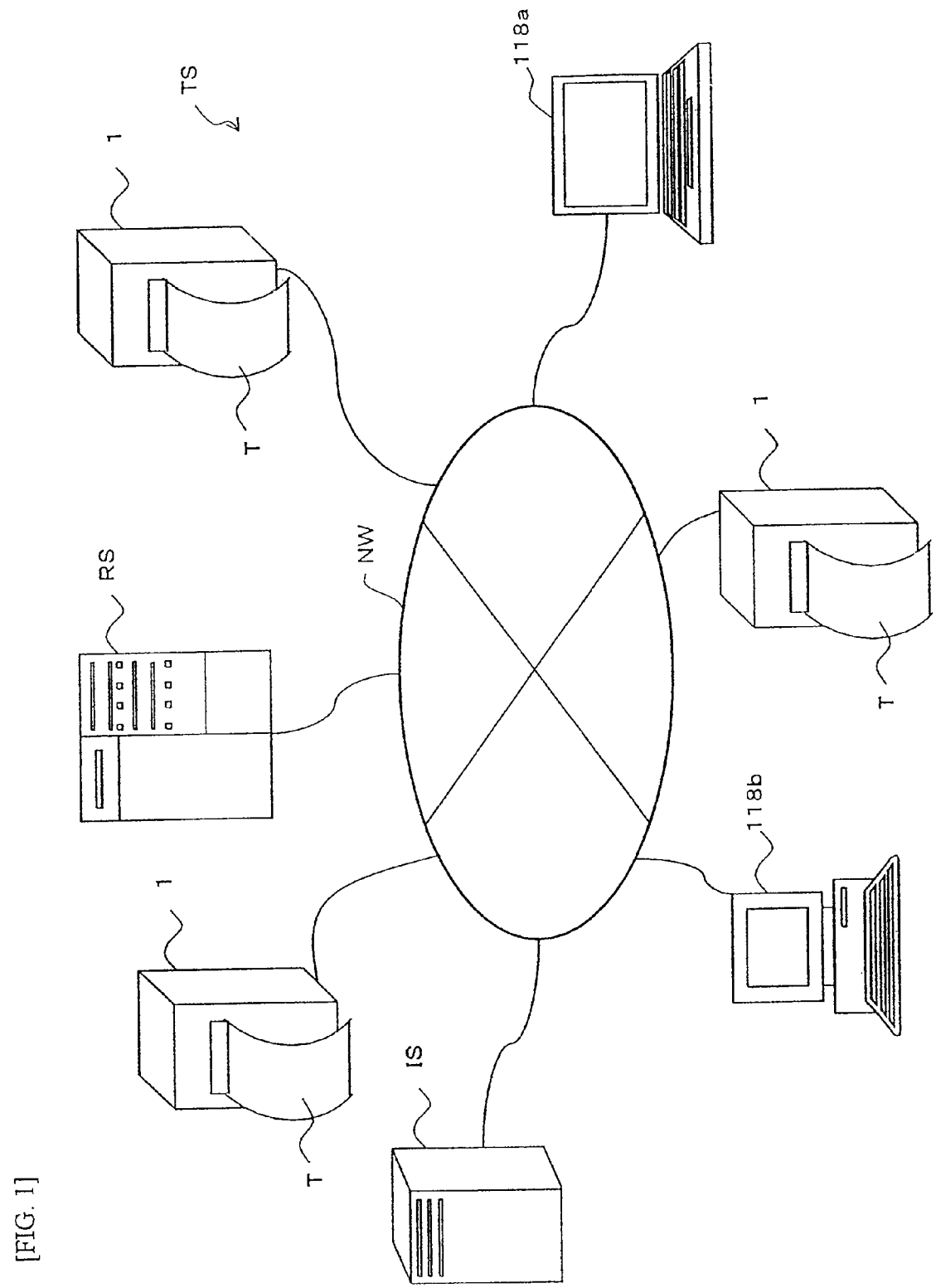

[FIG. 2]
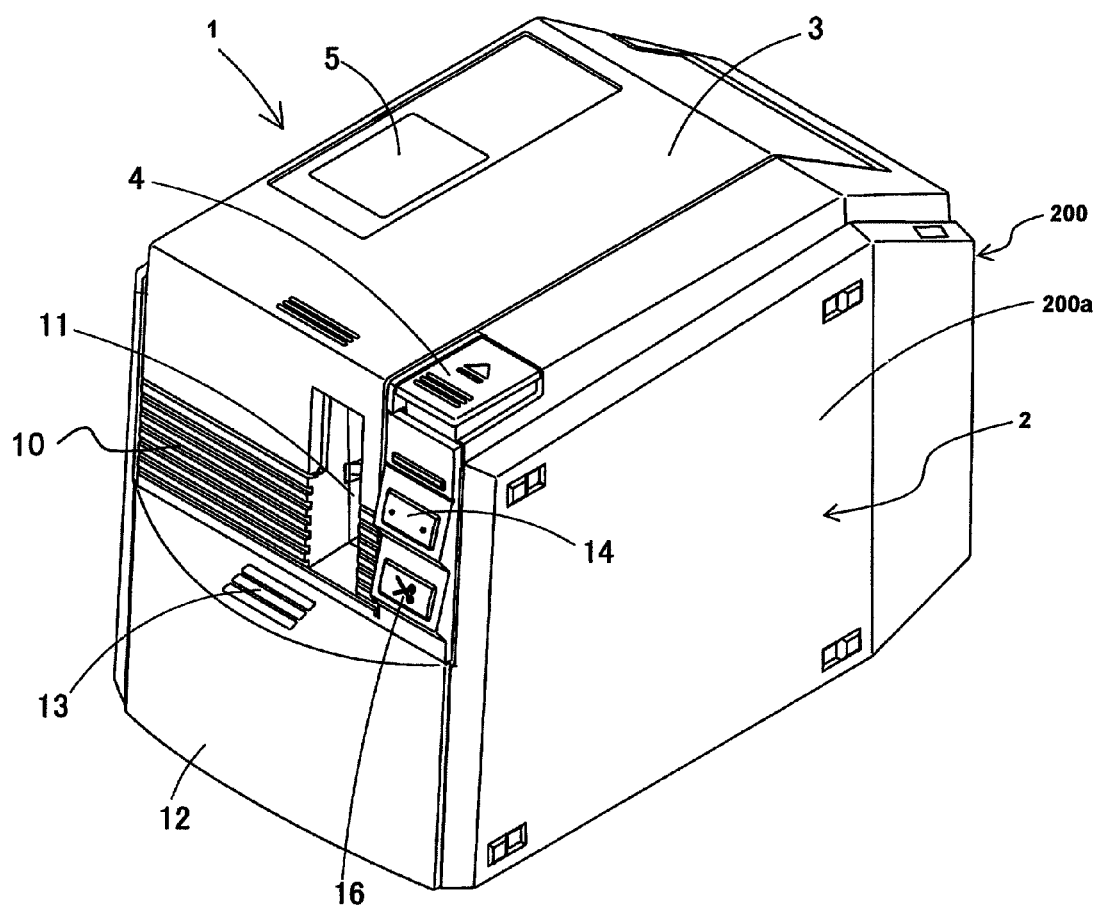

[FIG. 3]
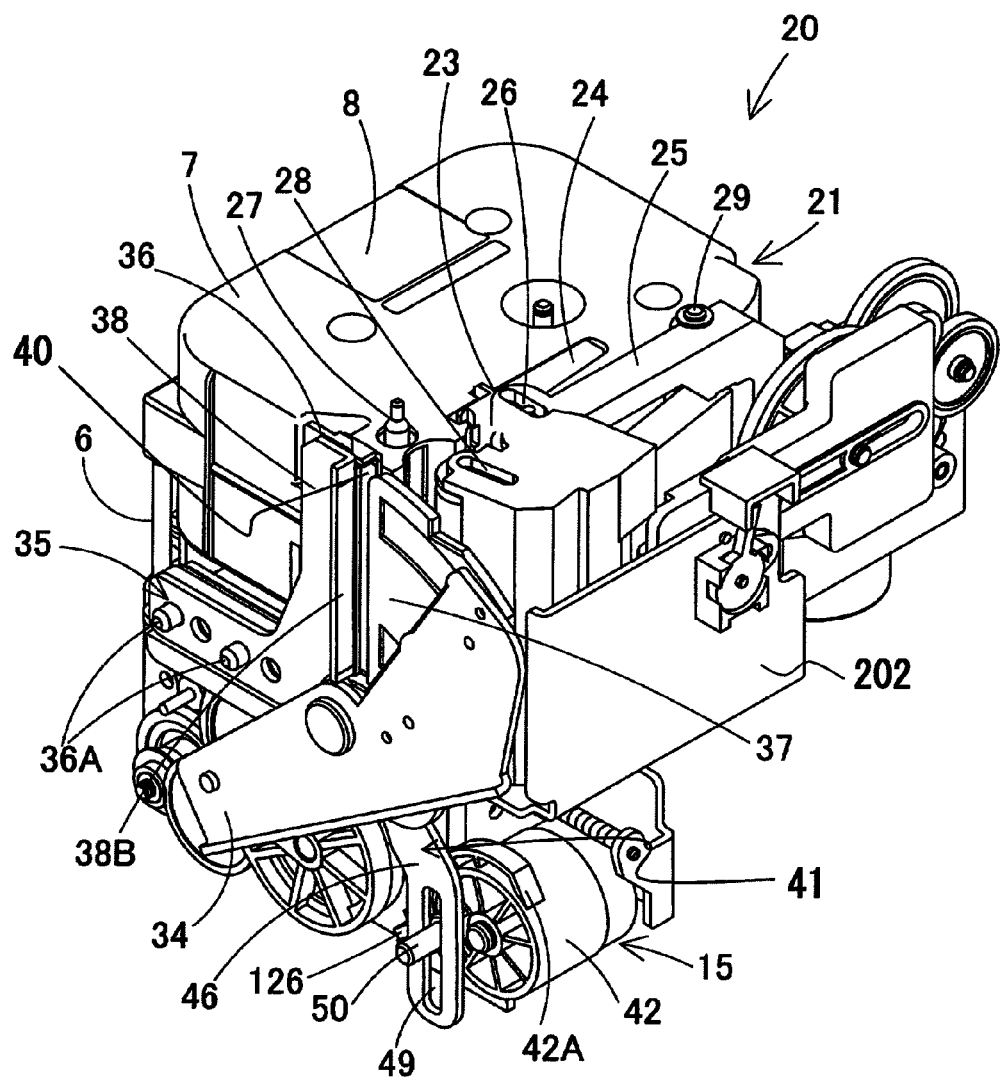

[FIG. 4]
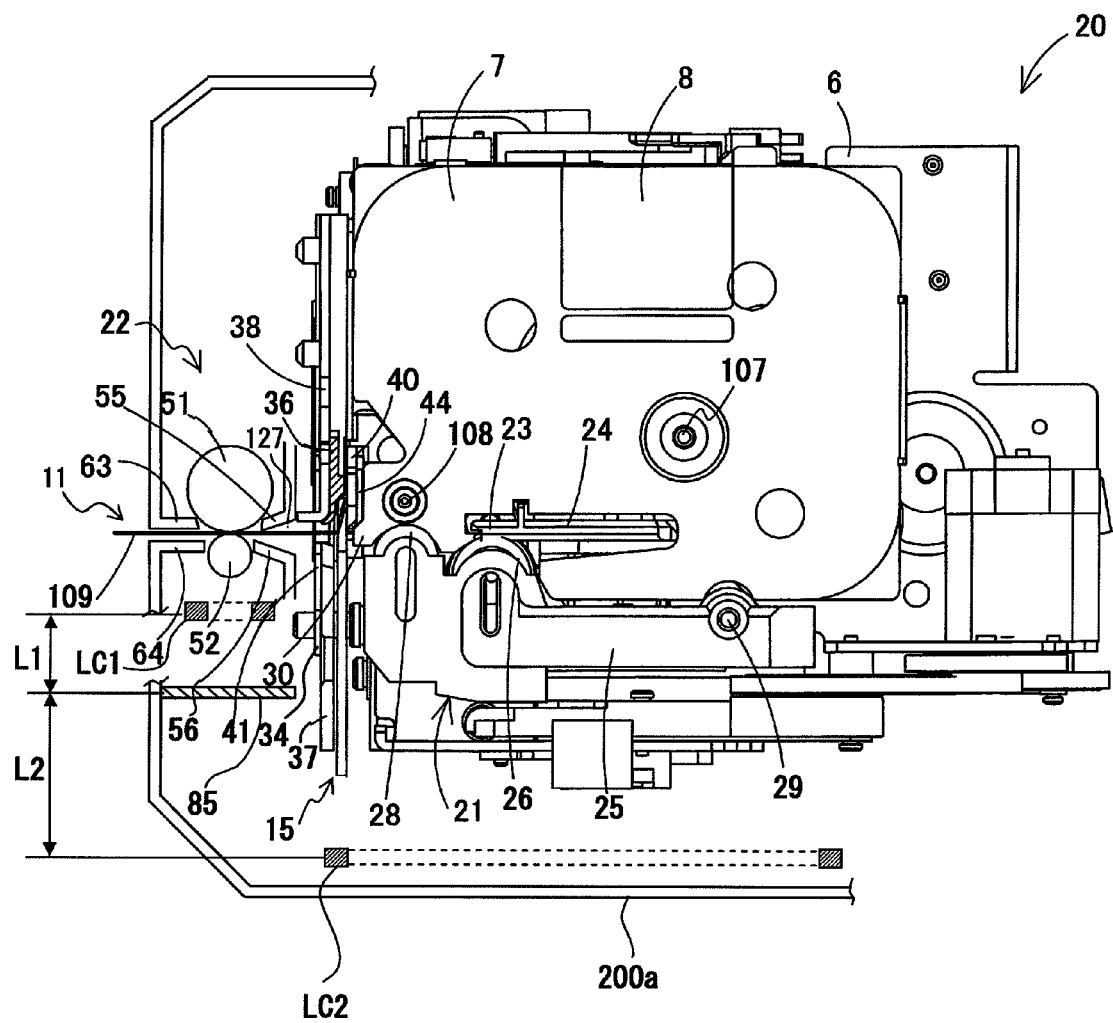

[FIG. 5]
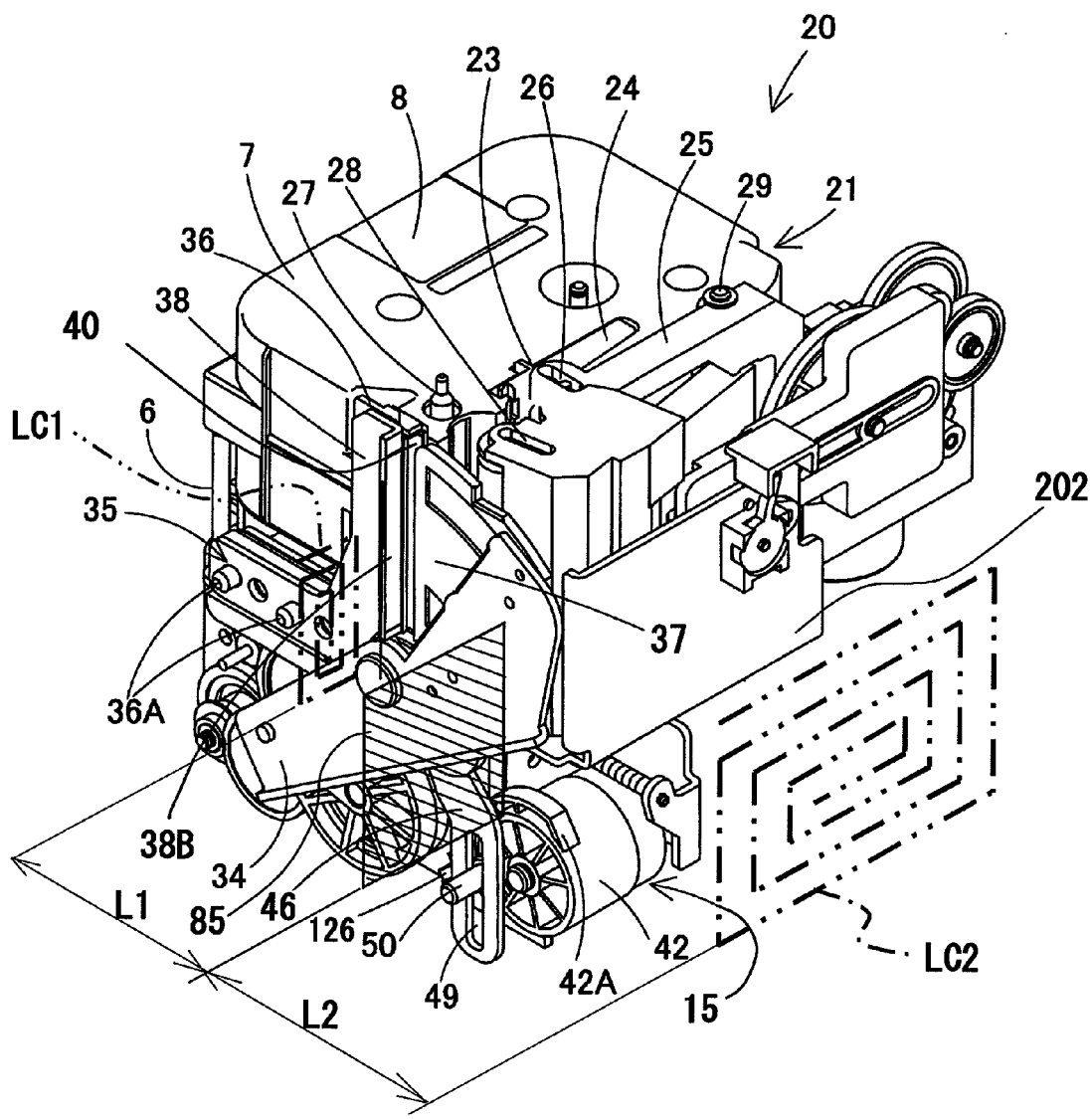

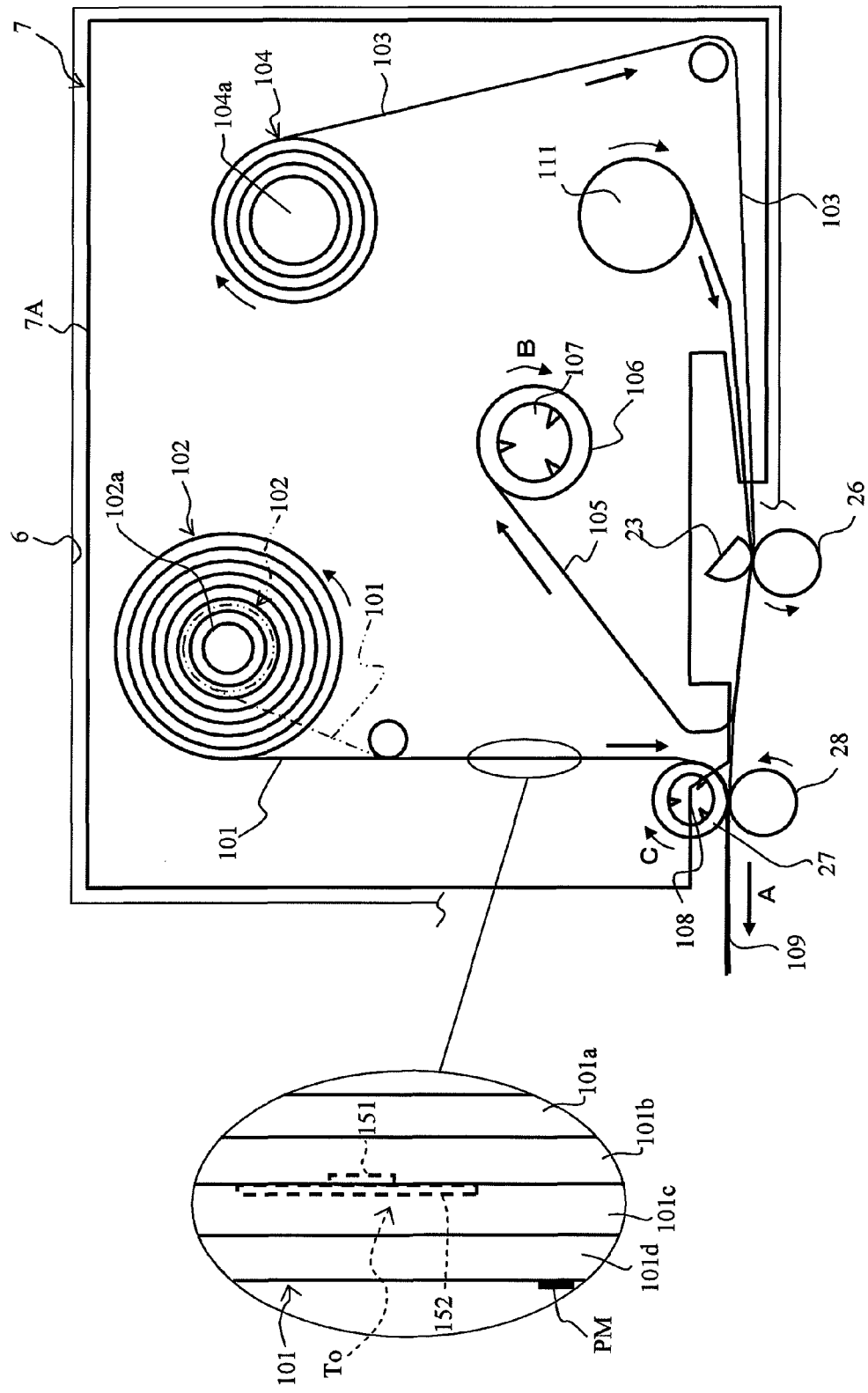
[FIG. 6]

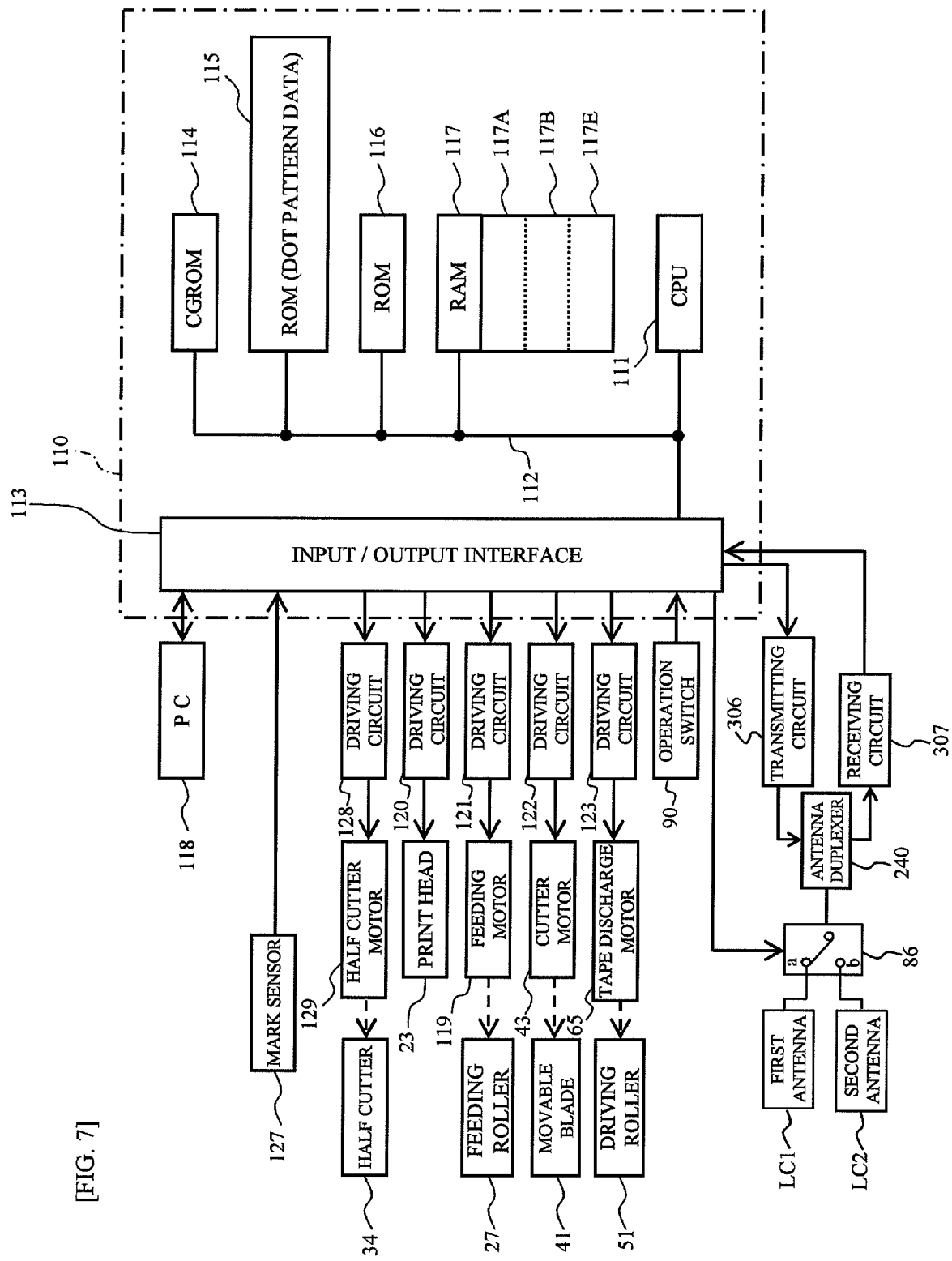
[FIG. 7]

[FIG. 8]
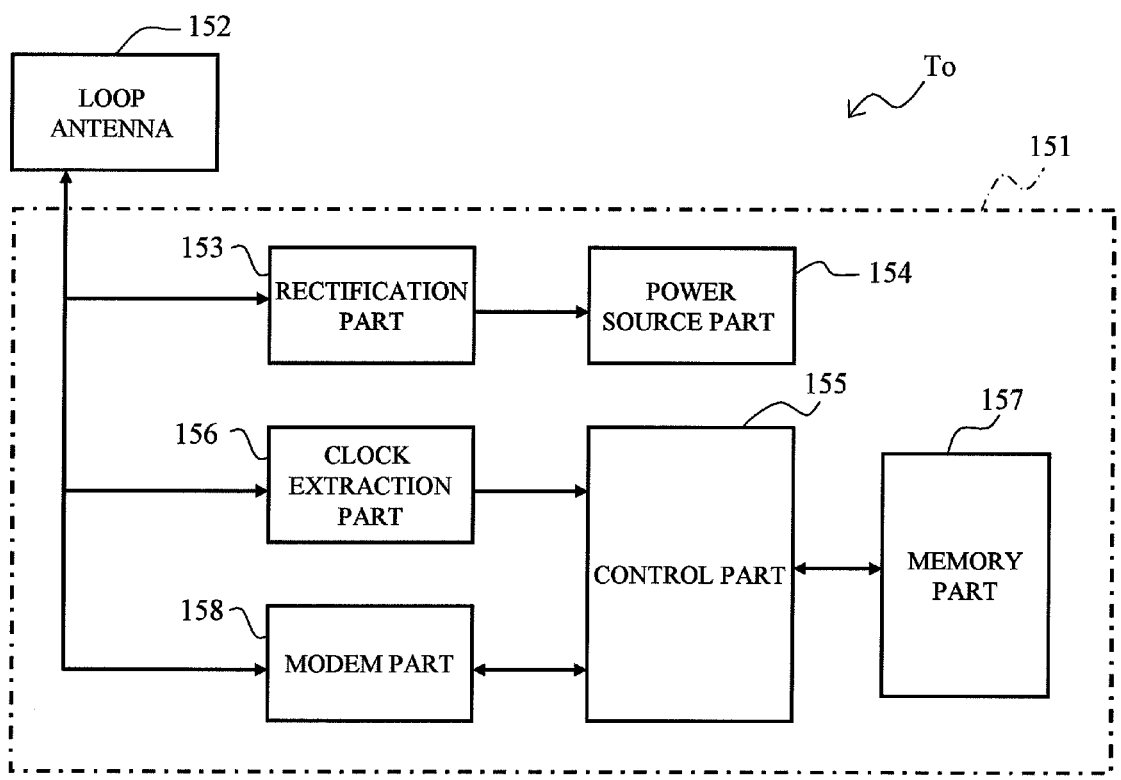

[FIG. 9A]
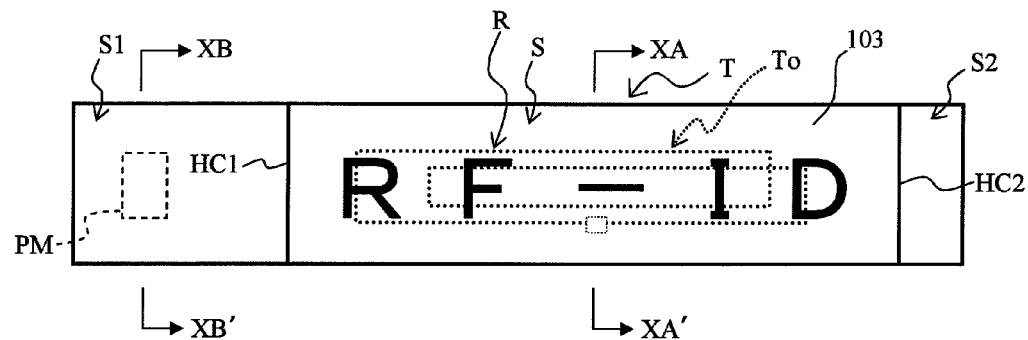
[FIG. 9B]
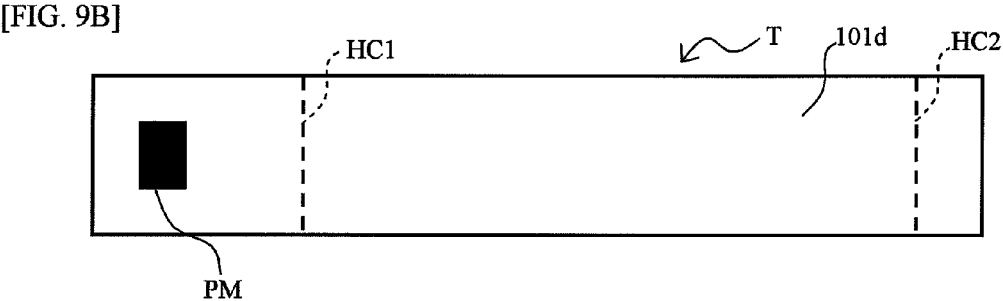

[FIG. 10A]
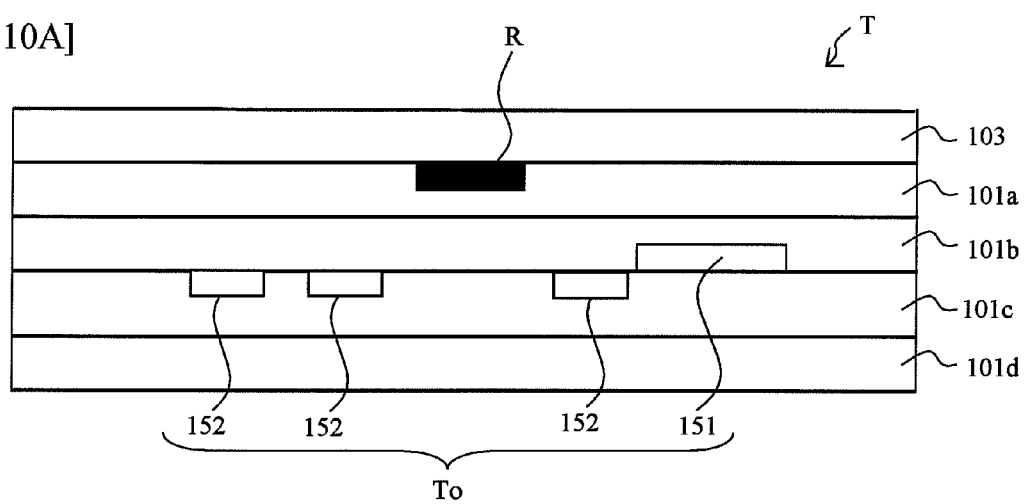
[FIG. 10B]
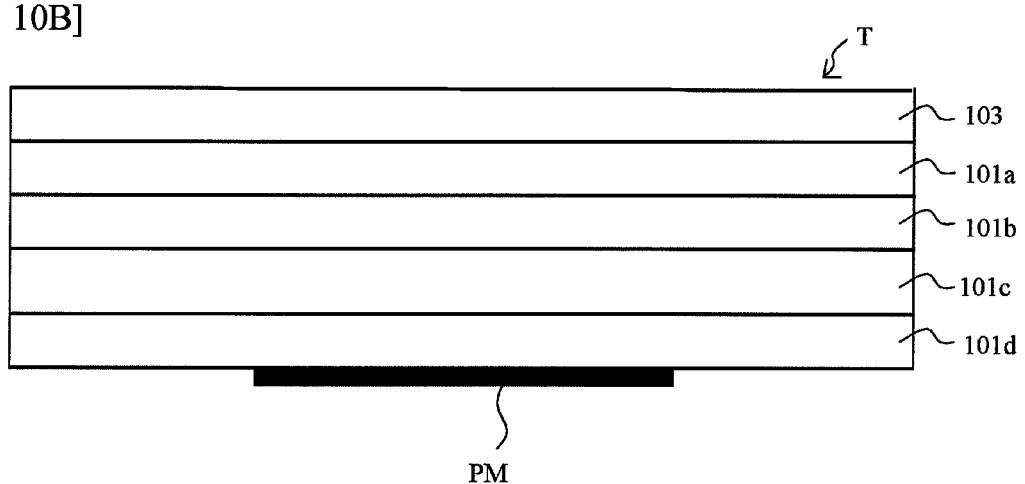

[FIG. 11]
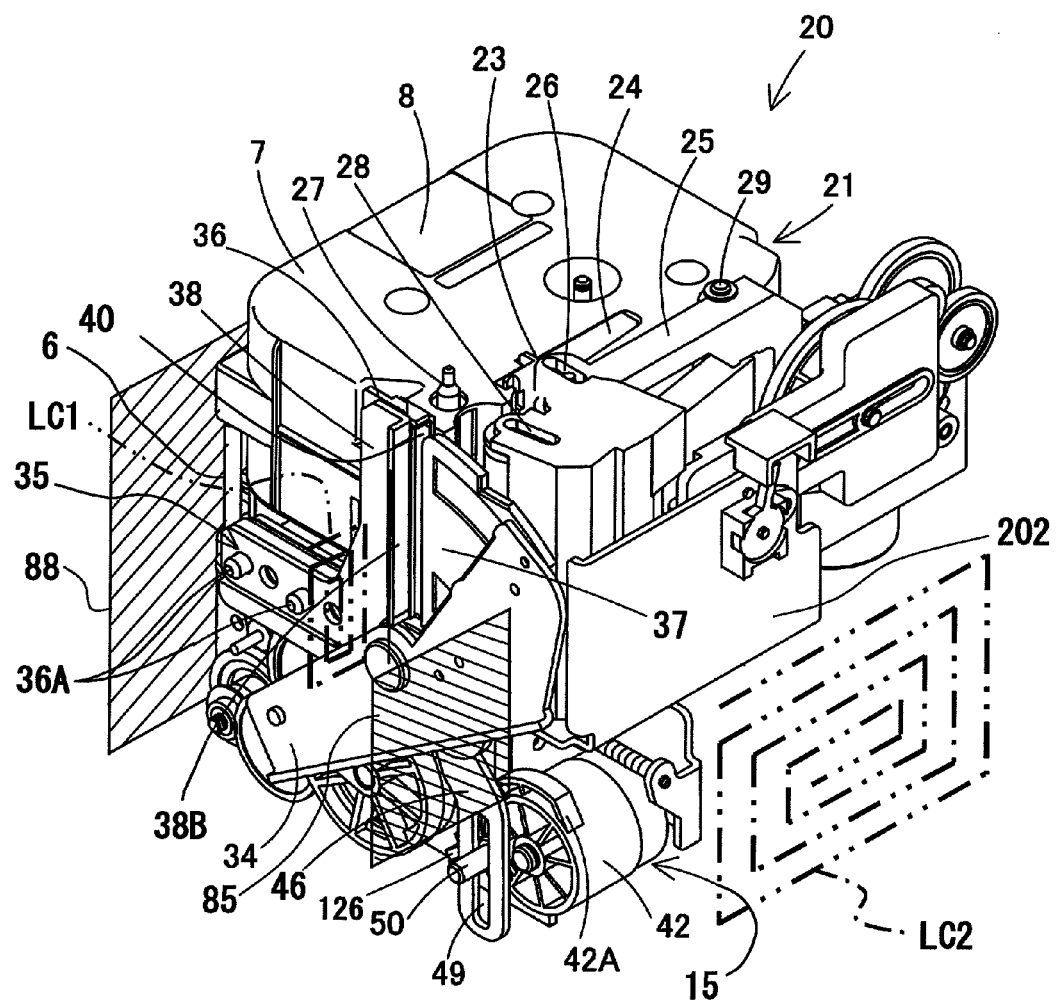

[FIG. 12]
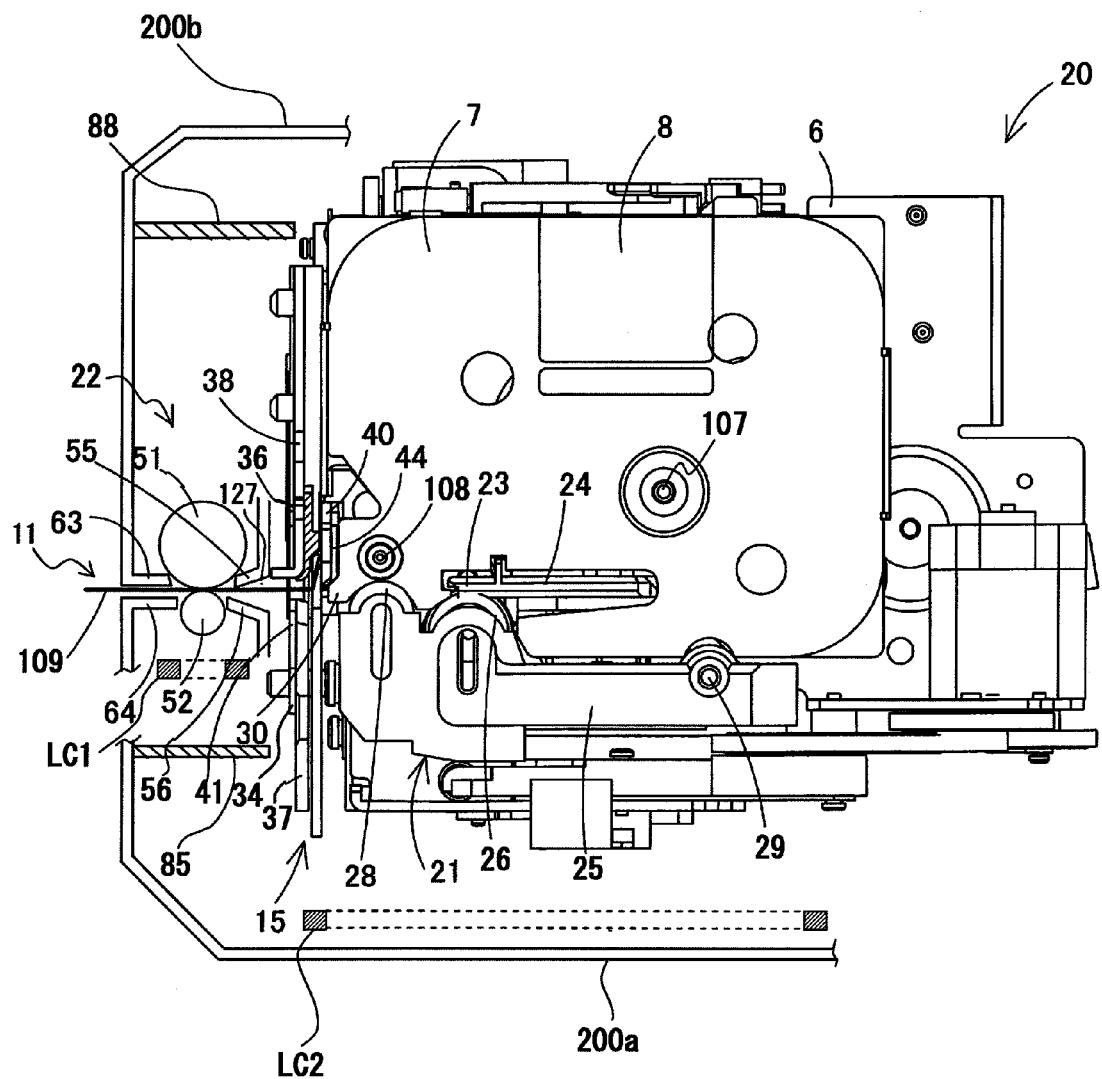

[FIG. 13]
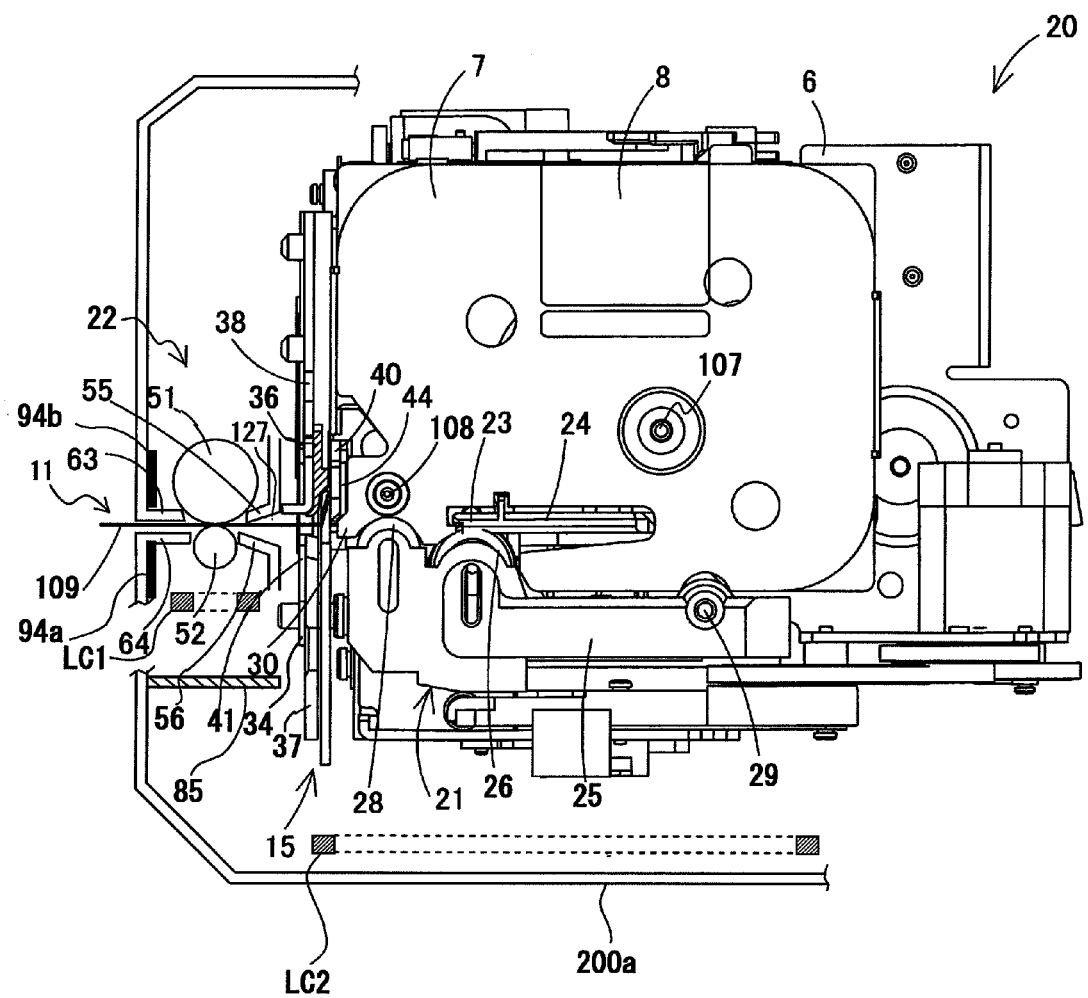

[FIG. 14]
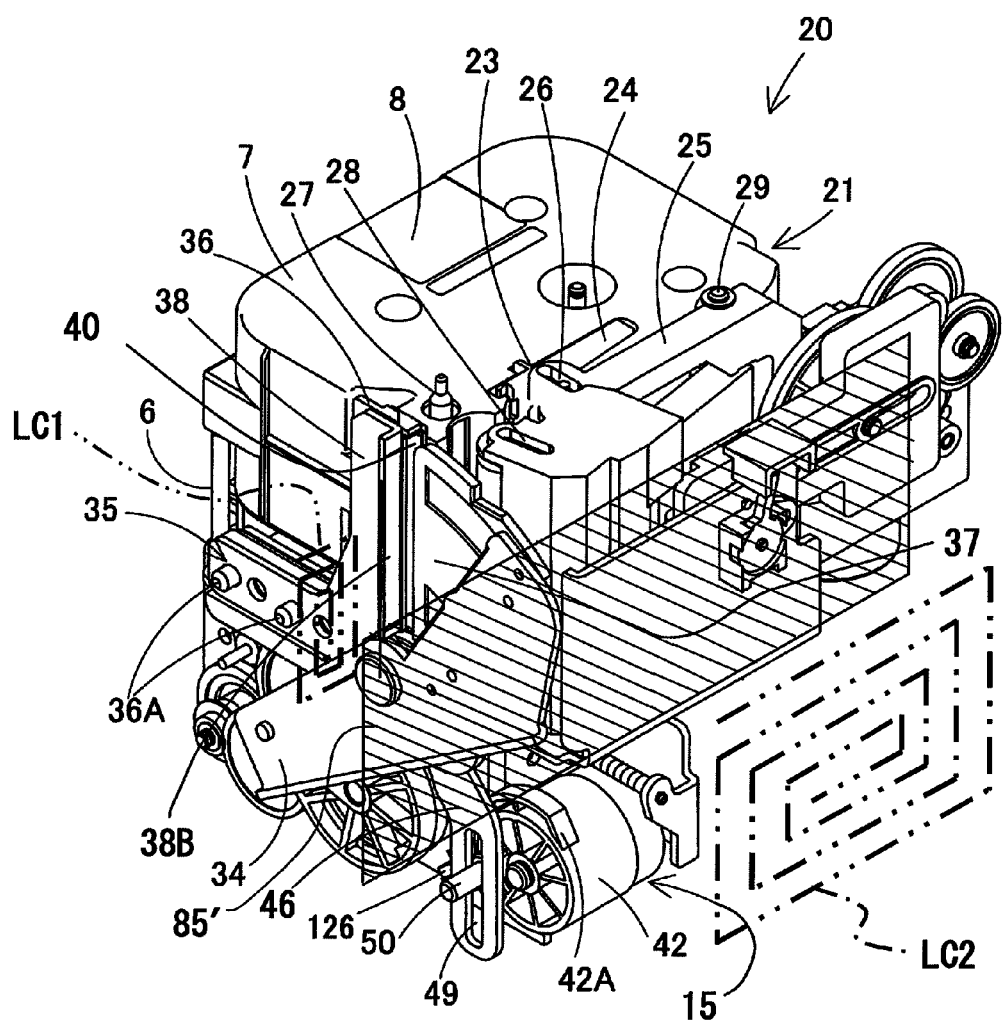

[FIG. 15]
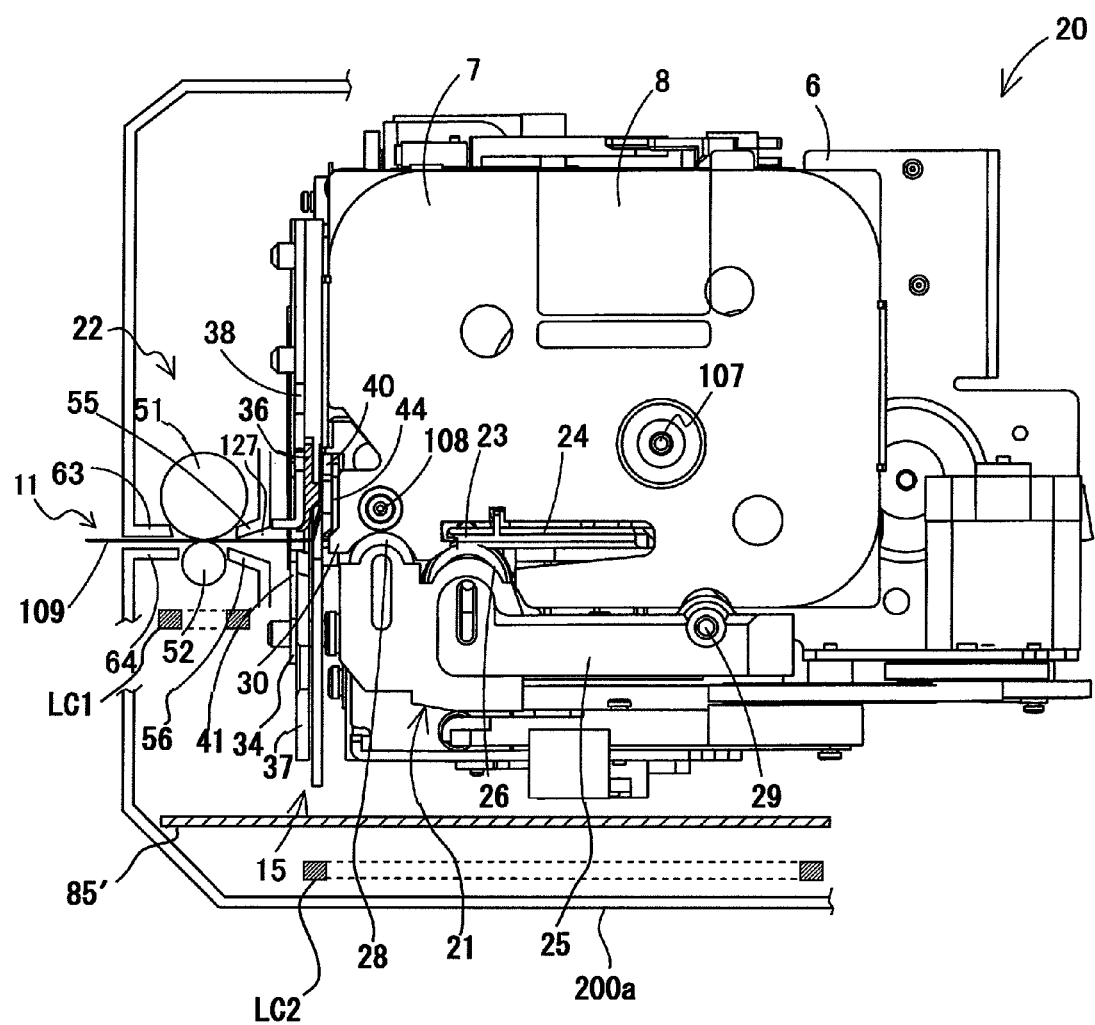

[FIG. 16]
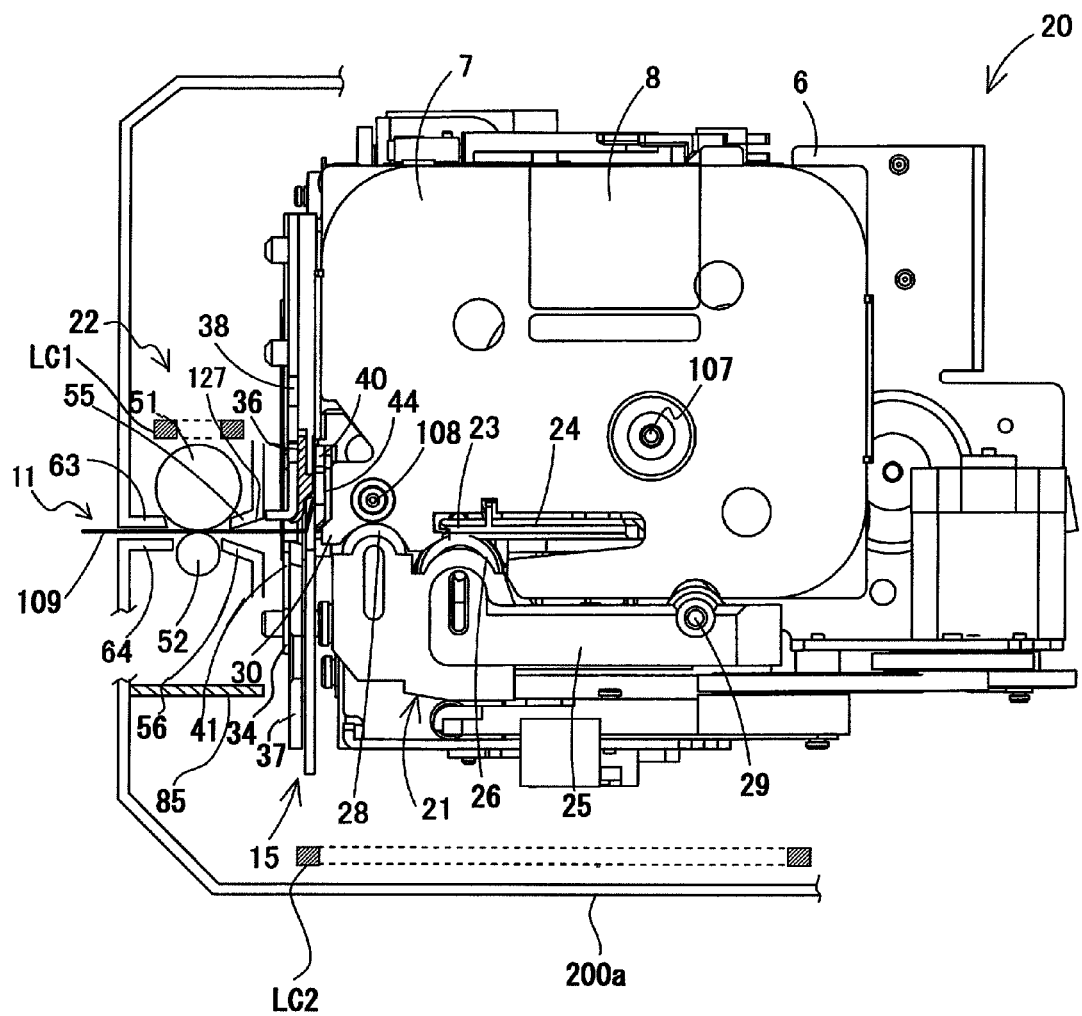

APPARATUS FOR PRODUCING RFID LABELS

CROSS-REFERENCE TO RELATED APPLICATIONS

This application claims priority from JP 2007-077698, filed Mar. 23, 2007, the contents of which are hereby incorporated by reference.

BACKGROUND OF THE INVENTION

1. Field of the Invention

The present invention relates to an apparatus for producing RFID labels configured to produce a RFID label provided with a RFID circuit element for radio communication of information with the outside.

2. Description of the Related Art

A RFID (Radio Frequency Identification) system is known for information reading/writing contactlessly between a small-sized RFID tag and a reader (reading device)/writer (writing device). A RFID circuit element provided at a label-state RFID tag is provided with an IC circuit part storing predetermined RFID tag information and an antenna connected to the IC circuit part for transmission and reception of information. When a transmission wave is transmitted to the RFID circuit element from an antenna of a reader as an interrogator, the RFID circuit element transmits a reply using energy of an electric wave in the transmission wave. One of related arts configured to read information from the RFID circuit element using the reader as above is described in JP, A, 2005-298100, for example.

This related art is to read out and acquire stored information in a file or the RFID circuit element (RFID circuit element for acquiring information) held by a person using the reader by connecting an operation terminal (PC) and the reader to each other and by performing a predetermined operation at the operation terminal.

On the other hand, an apparatus for producing RFID labels configured to produce a RFID label by writing RFID tag information in the above RFID circuit element has been proposed (JP, A, 2005-186567, for example). In this related art, a band-state tag tape (base tape) on which RFID circuit elements (RFID circuit element for producing a label) are provided with a predetermined interval is fed out from a roll of tape with RFID tag (first roll), while a print-receiving tape fed out from another roll (second roll) is bonded to the tag tape. At this time, predetermined RFID tag information produced on the side of the apparatus is transmitted and written in the IC circuit part of the RFID circuit element for producing a label on the tag tape, and print corresponding to the RFID tag information to be written is applied on the print-receiving tape by a printing means so that a RFID label with print is produced.

SUMMARY OF THE INVENTION

In general, a RFID label produced by the apparatus for producing RFID labels as described in Patent Document 2 is provided in association such as affixation on a target to be managed (articles or the like). Then, the RFID tag information is read out by a reader as described in Patent Document 1 from the RFID label provided on the article or the like so that information on the article is acquired and the article is managed. In order to actually manage articles or the like by producing and using the RFID label, both functions of the reader and the apparatus for producing RFID labels are needed.

However, considering the configuration provided with the both functions, an antenna for information reading from the RFID circuit element for acquiring information provided at the reader in the related art and an antenna provided at the apparatus for producing RFID labels in the related art for information writing in the RFID circuit element for producing a label are both provided in the apparatus. In this case, co-existence of the two antennas might cause communication interference, communication jamming or miscommunication, resulting in degradation of communication stability and reliability.

The present invention has an object to provide an apparatus for producing RFID labels that can execute both a function to read out RFID tag information from outside the apparatus and a function to produce a RFID label in the apparatus while preventing degradation of communication stability and reliability.

BRIEF DESCRIPTION OF THE DRAWING

FIG. 1 is a system block diagram illustrating a RFID tag manufacturing system provided with an apparatus for producing RFID labels, which is an embodiment of the present invention.

FIG. 2 is a perspective view illustrating an entire configuration of the apparatus for producing RFID labels.

FIG. 3 is a perspective view illustrating a configuration of an internal unit inside the apparatus for producing RFID labels.

FIG. 4 is a plan view illustrating a configuration of the internal unit inside the apparatus for producing RFID labels.

FIG. 5 is an explanatory view for illustrating a positional relation among a shielding member, an antenna for producing a label, and a loop antenna for acquiring information.

FIG. 6 is an enlarged plan view schematically illustrating a detailed configuration of a cartridge.

FIG. 7 is a functional block diagram illustrating a control system of the apparatus for producing RFID labels.

FIG. 8 is a functional block diagram illustrating a functional configuration of a RFID circuit element.

FIGS. 9A and 9B are top view and bottom view respectively illustrating an example of an appearance of the RFID label.

FIGS. 10A and 10B are a view obtained by rotating a cross sectional view by an XA-XA' section in FIG. 9A counterclockwise by 90 degrees and a view obtained by rotating a cross sectional view by an XB-XB' section in FIG. 9A counterclockwise by 90 degrees, respectively.

FIG. 11 is a perspective explanatory view illustrating a configuration of an internal unit inside an apparatus for producing RFID labels according to a variation in which another shielding member is provided on the opposite side of the shielding member from a feeding path.

FIG. 12 is a plan view illustrating a configuration of the internal unit.

FIG. 13 is a plan view illustrating a configuration of the internal unit inside an apparatus for producing RFID labels according to a variation in which a shielding member is also provided on the side of a carry-out exit.

FIG. 14 is a perspective explanatory view illustrating a configuration of the internal unit inside an apparatus for producing RFID labels according to a variation in which a shield plate with the size equal to or larger than an antenna is provided.

FIG. 15 is a plan view illustrating a configuration of the internal unit.

FIG. 16 is a plan view illustrating a configuration of the internal unit inside an apparatus for producing RFID labels according to a variation in which a position of an antenna is on the opposite side of the feeding path.

DETAILED DESCRIPTION OF THE PREFERRED EMBODIMENTS

An embodiment of the present invention will be described below referring to the attached drawings.

FIG. 1 is a system block diagram illustrating a RFID tag manufacturing system provided with an apparatus for producing RFID labels of the present embodiment.

In a RFID tag manufacturing system TS shown in FIG. 1, an apparatus 1 for producing RFID labels is connected to a route server RS, a plurality of information servers IS, a terminal 118a, and a general-purpose computer 118b through a wired or radio communication line NW. The terminal 118a and the general-purpose computer 118b are collectively referred to simply as "PC 118" below as appropriate.

FIG. 2 is a perspective view illustrating the entire structure of the apparatus 1 for producing RFID labels.

In FIG. 2, the apparatus 1 for producing RFID labels produces a RFID label with print using a tag medium provided with a RFID circuit element for producing a label in the apparatus based on operation from the PC 118 and reads out (acquires) information from a RFID circuit element for acquiring information outside the apparatus.

The apparatus 1 for producing RFID labels includes a main body 2 having a housing 200 in the substantially regular hexahedron (substantially cubic) shape in the shell and an opening/closing lid 3 provided capable of being opened/closed (or may be detachable) on the top face of the main body 2.

The housing 200 of the main body 2 includes a front wall 10 located at the device front side (left front side in FIG. 2) and provided with a label carry-out exit 11 configured to discharge a RFID label T (which will be described later) produced inside the main body 2 to the outside and a front lid 12 provided below the label carry-out exit 11 in the front wall 10 and having its lower end rotatably supported. The front wall 10 and the front lid 12 constitute a discharge-side wall face portion.

The front lid 12 is provided with a pusher portion 13, and the front lid 12 is opened forward by pushing in this pusher portion 13 from above. Also, at one end of the front wall 10, the power button 14 for powering on/off of the apparatus 1 for producing RFID labels is provided. Below this power button 14, a cutter driving button 16 is provided for driving a cutting mechanism 15 (See FIG. 3, which will be described later) disposed in the main body 2 through manual operation by an operator. A tag label tape 109 with print (See FIG. 4, which will be described later) is cut to a desired length so as to produce the RFID label T by pushing this button 16.

The opening/closing lid 3 is pivotally supported at the end on the right depth side in FIG. 2 of the main body 2 and urged in the opening direction all the time by an urging member such as a spring. When the opening/closing button 4 arranged adjacently to the opening/closing lid 3 on the top face of the main body 2 is pushed, lock between the opening/closing lid 3 and the main body 2 is released and opened by action of the urging member. A see-through window 5 covered by a transparent cover is provided at the side center of the opening/closing lid 3.

FIG. 3 is a perspective view illustrating a configuration of an internal unit 20 inside the apparatus 1 for producing RFID labels (however, loop antennas LC1, LC2 and a shielding member 85, which will be described later, are omitted). In FIG. 3, the internal unit 20 includes a cartridge holder 6 storing a cartridge 7, a printing mechanism 21 provided with a print head (thermal head) 23, the cutting mechanism (cutter) 15 provided with a fixed blade 40 and a movable blade 41, and a half-cut unit 35 provided with a half cutter 34 (half-cutter) and located on the downstream side in the tape transport direction of the fixed blade 40 and the movable blade 41.

On the top face of the cartridge 7, a tape identification display part 8 displaying the tape width, tape color and the like of the base tape 101 built in the cartridge 7, for example, is provided. Also, in the cartridge holder 6, a roller holder 25 is pivotally supported by a support shaft 29 so that switching can be made between a printing position (contact position, see FIG. 4, which will be described later) and a release position (separated position) by a switching mechanism. At this roller holder 25, a platen roller 26 and a sub-roller 28 are rotatably disposed, and when the roller holder 25 is switched to the printing position, the platen roller 26 and the sub-roller 28 are pressed onto the print head 23 and a feeding roller 27.

The print head 23 is provided with a large number of heating elements and mounted on a head mounting portion 24 installed upright at the cartridge holder 6. The head mounting portion 24 at least partially includes a metal portion (first metal portion) provided with a function for shielding or attenuating an electromagnetic wave (electric field and magnetic field). The first metal portion is electrically connected to a metal frame 202 and also functions as a radiator plate of the heating elements. The print head 23 and the head mounting portion 24 constitute the printing device.

The cutting mechanism 15 is provided with the fixed blade 40 and the movable blade 41 composed of metal members. At least one of the fixed blade 40 and the movable blade 41 is provided with a metal portion (second metal portion) having a function to shield or attenuate the electromagnetic wave substantially along a transport direction of the tag label tape 109 with print (front left direction from right depth in FIG. 3. The right and left direction in FIG. 4, which will be described later). A driving force of a cutter motor 43 (See FIG. 7, which will be described later) is transmitted to a shank portion 46 of the movable blade 41 through a cutter helical gear 42, a boss 50, and a long hole 49 and the movable blade is rotated around a rotary shaft, not shown, as a rotating fulcrum, to perform cutting operation with the fixed blade 40. The rotary shaft is electrically connected to the metal frame 202 in the end through a metal intermediate connecting member, not shown, by which the movable blade 41 is grounded. If the second metal portion is provided on the fixed blade 40, the fixed blade 40 is also electrically connected to the housing 200 in the end through the metal intermediate connecting member, not shown, and grounded. The above cut state is detected by a micro switch 126 switchable by operation of a cam 42A for cutter helical gear.

In 6the half cut unit 35, a cradle 38 and the half cutter 34 are arranged opposite to each other, and a first guide portion 36 and a second guide portion 37 are mounted on a side plate 44 (See FIG. 4, which will be described later) by a guide fixing portion 36A. The half cutter 43 is at least partially provided with a metal portion (third metal portion) having a function to shield or attenuate the electromagnetic wave substantially along the transport direction (left front direction from the right depth in FIG. 3. The right and left direction in FIG. 4, which will be described later) of the tag label tape 109 with print. The half cutter 34 is rotated by a driving force of a half cutter motor 129 (See FIG. 7, which will be described later) around a predetermined rotary shaft (not shown) as its rotating center. This rotary shaft is electrically connected to the metal frame 202 in the end through a metal intermediate connecting member, not shown, by which the half cutter 34 is grounded. At the end of the cradle 38, a receiving face 38B is formed.

FIG. 4 is a plan view illustrating the configuration of the internal unit 20 shown in FIG. 3. In FIG. 4, the cartridge holder 6 stores the cartridge 7 so that the direction of the tag label tape 109 with print in the width direction discharged from a tape discharge portion 30 of the cartridge 7 and further discharged from the label carry-out exit 11 should be perpendicular in the vertical direction.

Also, in the internal unit 20, a label discharge mechanism 22, the loop antenna LC1 for producing a label (label producing antenna), and the loop antenna LC2 for acquiring information (information acquiring antenna) are provided.

The loop antenna LC1 for producing a label includes a communicable region inside the housing 200 and configured capable of transmission and reception of information with respect to the RFID circuit element To for producing a label provided at the tag label tape 109 with print. This loop antenna LC1 for producing a label is provided in the vicinity of the feeding path in a direction (vertical direction in FIG. 4, for example) crossing the feeding path (right and left direction in FIG. 4) of the tag label tape 109 with print.

The loop antenna LC2 for acquiring information is provided on a wall face other than the discharge-side wall face portion in the housing 200 (constituted by the front wall 11 and the front lid 12), on a side wall face 200a (FIG. 2) on the lower part in FIG. 4 (right front side in FIG. 2) in this embodiment via a support member, not shown, for example. The loop antenna LC2 for acquiring information includes a communicable region on the outer side of the housing 200 and is configured capable of transmission and reception of information with respect to the RFID circuit element To for acquiring information located outside the housing 200. A position of a radial center shaft (extending in the vertical direction in FIG. 4. Not shown) of a coil of the loop antenna LC2 for acquiring information is displaced in the right and left direction in FIG. 4 from a position of a radial center shaft (extending in the vertical direction. Not shown) of a coil of the loop antenna LC1 for producing a label.

So as to cover at least the side of the loop antenna LC2 for acquiring information in the loop antenna LC1 for producing a label (at an intermediate portion between the loop antenna LC1 for producing a label and the loop antenna LC2 for acquiring information), a shielding member 85 (first shielding member) is provided. In other words, on one side (upper part in FIG. 4) of the loop antenna LC1 for producing a label, the feeding path (in the right and left direction in FIG. 4) of the tag label tape 109 with print is located, while on the other side of the loop antenna LC1 for producing a label (lower part in FIG. 4), the shielding member 85 is located. As a result, in a direction (vertical direction in FIG. 4, for example) crossing the feeding path of the tag label tape 109 with print, the loop antenna LC1 for producing a label, the shielding member 85, and the loop antenna LC2 for acquiring information are arranged in this order. Particularly in this embodiment, arrangement is made so that a relation between a distance L1 from the shielding member 85 to the loop antenna LC1 for producing a label and a distance L2 from the shielding member 85 to the loop antenna LC2 for acquiring information is $L1 \leq L2$.

The shielding member 85 is composed of a plate-state member made of metal (iron, aluminum or the like), for example (See also FIG. 5, which will be described later) and provided with a function to shield or attenuate the electromagnetic wave (electric field and magnetic field). It may be constructed by applying appropriate conductive paint (solvent conductive silver, nickel, silver-plated copper, black lead, copper paint or aqueous conductive black lead, silver, silver-plated copper paint or the like) on the surface of a non-metal plate-state member. In this case, an installation space is not needed as in the case of shielding through provision of a plate member or the like and the freedom of layout in the housing 200 can be also improved, which are advantages. Also, if an electromagnetic wave absorbing material is used as the shielding member 85, the similar function can be realized. If the shielding member 85 is composed of a metal plate-state member, the shielding member 85 is grounded to the metal frame 202 at a position, not shown.

The label discharge mechanism 22 discharges the tag label tape 109 with print after being cut by the cutting mechanism 15 (in other words, the RFID label T. The same applies to the following) from the label carry-out exit 11 (See FIG. 2). That is, the label discharge mechanism 22 includes a driving roller 51 rotated by a driving force of a tape discharge motor 123 (See FIG. 7, which will be described later), a pressure roller 52 opposed to the driving roller 51 with the tag label tape 109 with print between them, and a mark sensor 127 for detecting an identification mark PM (See FIG. 6, which will be described later) provided at the tag label tape 109 with print. At this time, first guide walls 55, 56 and second guide walls 63, 64 for guiding the tag label tape 109 with print to the label carry-out exit 11 and the loop antenna LC1 for producing a label are provided inside the label carry-out exit 11. The first guide walls 55, 56 and the second guide walls 63, 64 are integrally formed, respectively, and arranged at the discharge position of the tag label tape 109 with print (RFID label T) cut by the fixed blade 40 and the movable blade 41 so that they are separated from each other with a predetermined interval.

A feeding roller drive shaft (feeding device) 108 and a ribbon take-up roller driving shaft 107 give a feeding drive force of the tag label tape 109 with print and an ink ribbon 105 (which will be described later), respectively, and are driven to rotate in conjunction with each other.

FIG. 5 is an explanatory view for illustrating a positional relation among the shielding member 85, the loop antenna LC1 for producing a label, and the loop antenna LC2 for acquiring information and corresponds to FIG. 3.

In FIG. 5, the loop antenna LC2 for acquiring information has the size of a radial dimension of its coil larger than that of the loop antenna LC1 for producing a label. As already mentioned, the size of the distance L1 from the shielding member 85 to the loop antenna LC1 for producing a label is arranged so as to be equal to or smaller than the distance L2 from the shielding member 85 to the loop antenna LC2 for acquiring information.

FIG. 6 is an enlarged plan view schematically illustrating a detailed structure of the cartridge 7. In FIG. 6, the cartridge 7 has a housing 7A, a first roll 102 (actually, it is wound in a swirl state but shown concentrically in the figure for simplification) arranged inside the housing 7A and around which the base tape 101 in the band state is wound, a second roll 104 (actually, it is wound in a swirl state but shown concentrically in the figure for simplification) around which a transparent cover film 103 (print-receiving medium) having substantially the same width as that of the base tape 101 is wound, a ribbon-supply-side roll 211 feeding out the ink ribbon 105 (thermal transfer ribbon, however, it is not needed when the print-receiving tape is a thermal tape), the ribbon take-up roller 106 winding up the ribbon 105 after printing, and the feeding roller 27 rotatably supported in the vicinity of the tape discharge portion 30 of the cartridge 7. The base tape 101 and the tag label tape 109 with print in which the cover film 102 is bonded to the base tape 101 constitute the tag medium.

The feeding roller 27 presses and bonds the base tape 101 and the cover film 103 together so as to have the tag label tape 109 with print and feeds the tape in a direction shown by an arrow A in FIG. 6 (also functioning as a pressure roller).

In the first roll 102, the base tape 101 in which a plurality of RFID circuit elements To for producing a label are sequentially arranged in the longitudinal direction with a predetermined equal interval is wound around a reel member 102a. The base tape 101 has a four-layered structure (See the partially enlarged view in FIG. 6) in this example and is constructed in lamination in the order of an adhesive layer 101a made of an appropriate adhesive, a colored base film 101b made of polyethylene terephthalate (PET) and the like, an adhesive layer 101c made of an appropriate adhesive, and a separation sheet (separation material) 101d from the side wound inside (right side in FIG. 6) toward the opposite side (left side in FIG. 6).

On the back side of the base film 101b (left side in FIG. 6), a loop antenna 152 constructed in the loop-coil shape for transmission and reception of information is provided integrally in this embodiment, the IC circuit part 151 connected to the antenna and storing information is formed, and the RFID circuit element To is constituted by them.

On the front side of the base film 101b (right side in FIG. 6), the adhesive layer 101a configured to bond the cover film 103 later is formed, while on the back side of the base film 101b (left side in FIG. 6), the separation sheet 101d is bonded to the base film 101b by the adhesive layer 101c provided so as to include the RFID circuit element To for producing a label.

When the RFID label T finally completed in the label state is to be affixed to a predetermined article or the like, the separation sheet 101d enables adhesion to the article by the adhesive layer 101c through separation of the separation sheet. Also, on the surface of the separation sheet 101d, at a predetermined position (in this embodiment, a position on the further front from the tip end of the loop antenna 152 in the front in the transport direction) corresponding to each RFID circuit element To for producing a label, a predetermined identification mark for feeding control (an identification mark painted in black in this embodiment. Alternatively, it may be a drilled hole penetrating the base tape 101 by laser machining or the like. Alternatively, it may be a Thomson type machined hole or the like.) PM is provided.

The second roll 104 has the cover film 103 wound around a reel member 104a. In the cover film 103 fed out of the second roll 104, the ribbon 105 arranged on its back face side (that is, the side to be bonded to the base tape 101) and driven by the ribbon-supply-side roll 211 and the ribbon take-up roller 106 is brought into contact with the back face of the cover film 103 by being pressed by the print head 23.

The ribbon take-up roller 106 and the feeding roller 27 are driven to rotate in conjunction by a driving force of a feeding motor 119 (See FIG. 3 and FIG. 7, which will be described later), which is a pulse motor, for example, provided outside the cartridge 7, transmitted to the ribbon take-up roller driving shaft 107 and the feeding roller drive shaft (feeding device) 108 via a gear mechanism, not shown. The print head 23 is arranged on the upstream side in the transport direction of the cover film 103 from the feeding roller 27.

In the above configuration, the base tape 101 fed out of the first roll 102 is supplied to the feeding roller 27. On the other hand, as for the cover film 103 fed out of the second roll 104, the ink ribbon 105 arranged on its back face side (that is, the side bonded to the base tape 101) and driven by the ribbon-supply-side roll 211 and the ribbon take-up roller 106 is pressed by the print head 23 and brought into contact with the back face of the cover film 103.

When the cartridge 7 is attached to the cartridge holder 6 and the roller holder 25 is moved from the release position to the printing position, the cover film 103 and the ink ribbon 105 are held between the print head 23 and the platen roller 26, and the base tape 101 and the cover film 103 are held between the feeding roller 27 and the sub-roller 28. Then, the ribbon take-up roller 106 and the feeding roller 27 are driven to rotate and by the driving force of the feeding motor 119 in a direction shown by an arrow B and an arrow C in FIG. 6, respectively, in synchronization with each other. At this time, the feeding roller drive shaft 108, the sub-roller 28 and the platen roller 26 are connected via the gear mechanism (not shown), and with the driving of the feeding roller drive shaft 108, the feeding roller 27, the sub-roller 28, and the platen roller 26 are rotated, and the base tape 101 is fed out of the first roll 102 and supplied to the feeding roller 27 as mentioned above. On the other hand, the cover film 103 is fed out of the second roll 104, and the plurality of heater elements of the print head 23 are electrified by a print-head driving circuit 120 (See FIG. 7, which will be described later) . As a result, print R (See FIG. 9, which will be described later) corresponding to the RFID circuit element To for producing a label on the base tape 101 to be the bonding target is printed on the back face of the cover film 103. Then, the base tape 101 and the cover film 103 on which the printing has been finished are bonded together by the feeding roller 27 and the sub-roller 28 to be integrated and formed as the tag label tape 109 with print and fed out of the cartridge 7 through the tape discharge portion 30 (See FIG. 4). The ink ribbon 105 finished with printing on the cover film 103 is wound up by the ribbon take-up roller 106 by driving of the ribbon take-up roller driving shaft 107.

Then, after information writing/reading is performed by the loop antenna LC1 for producing a label with respect to the tag label tape 109 with print produced by bonding as above in the RFID circuit element To for producing a label, the tag label tape 109 with print is cut by the cutting mechanism 15 automatically or by operating the cutter driving button 16 (See FIG. 2) and the RFID label T is produced. This RFID label T is discharged from the label carry-out exit 11 (See FIGS. 2 and 4) by the label discharge mechanism 22 after that.

FIG. 7 is a functional block diagram illustrating a control system of the apparatus 1 for producing RFID labels of the first embodiment. In FIG. 7, on a control board (not shown) of the apparatus 1 for producing RFID labels, a control circuit 110 is arranged.

At the control circuit 110, a CPU 111 controlling each device, an input/output interface 113 connected to this CPU 111 through a data bus 112, a CGROM 114, ROMs 115, 116, and a RAM 117 are provided.

In the ROM 116, a print driving control program for driving the print head 23, the feeding motor 119, and the tape discharge motor 65 by reading out data of a printing buffer in correspondence with an operation input signal from the PC 118, a cutting driving control program for feeding the tag label tape 109 with print to the cut position by driving the feeding motor 119 when printing is finished and cutting the tag label tape 109 with print by driving the cutter motor 43, and a tape discharge program for forcedly discharging the tag label tape 109 with print which has been cut (=RFID label T) from the label carry-out exit 11 by driving the tape discharge motor 65, a transmission program for generating access information such as an inquiry signal and a writing signal to the RFID circuit element To for producing a label or for acquiring information and outputting it to a transmitting circuit, a reception program for processing a response signal input from a receiving circuit, and other various programs required for control of the apparatus 1 for producing RFID labels are stored. The CPU 111 executes various calculations based on the various programs stored in the ROM 116.

In the RAM 117, a text memory 117A, a print buffer 117B, a parameter storage area 117E and the like are provided. In the text memory 117A, document data input from the PC 118 is stored. In the print buffer 117B, dot patterns for printing such as a plurality of characters and symbols and applied pulse number, which is a forming energy amount of each dot, are stored as the dot pattern data, and the print head 23 performs dot printing according to the dot pattern data stored in this print buffer 117B. In the parameter storage area 117E, various calculation data, tag identification information (tag ID) of the RFID circuit element To for acquiring information (above-mentioned) from which information is read (acquired) and the like are stored.

The PC 118, the print-head driving circuit 120 for driving the print head 23, a feeding motor driving circuit 121 for driving the feeding motor 119, a cutter motor driving circuit 122 for driving the cutter motor 43, a half cutter motor driving circuit 128 for driving the half cutter motor 129, the tape discharge motor driving circuit 123 for driving the tape discharge motor 65, the transmitting circuit 306 for generating a carrier wave for making an access (reading/writing) to the RFID circuit element To for producing a label or acquiring information through the loop antennas LC1, LC2 and for outputting an interrogating wave obtained by modulating the carrier wave based on a control signal input from the control circuit 110, the receiving circuit 307 for demodulating a response wave (a response signal) received through the loop antennas LC1, LC2 from the RFID circuit element To for producing a label or acquiring information and outputting it to the control circuit 110, and the mark sensor 127 for detecting the identification mark PM are connected to the input/output interface 113.

The transmitting circuit 306 and the receiving circuit 307 are connected to the loop antennas LC1, LC2 through an antenna duplexer 240 and a switching circuit 86. The switching circuit 86 switches the antenna duplexer 240 to be connected to the loop antenna LC1 for producing a label or the loop antenna LC2 for acquiring information based on a control signal from the control circuit 110. Specifically, the control circuit 110 controls the switching circuit 86 so that the antenna duplexer 240 is connected to the loop antenna LC1 for producing a label at a label production processing, while the antenna duplexer 240 is connected to the loop antenna LC2 for acquiring information at information acquisition processing.

In a control system centered on the control circuit 110, when character data or the like is input through the PC 118, the text (document data) is sequentially stored in the text memory 117A, the print head 23 is driven via the print-head driving circuit 120, and each of the heater elements is selectively heated/driven in correspondence with printing dots for one line for printing the dot pattern data stored in the print buffer 117B, and in synchronization with that, the feeding motor 119 performs feeding control of the tape via the driving circuit 121. Also, the transmitting circuit 306 performs modulation control of the carrier wave based on the control signal from the control circuit 110 and outputs the interrogating wave, and the receiving circuit 307 performs processing of the demodulated signal based on the control signal from the control circuit 110.

FIG. 8 is a functional block diagram illustrating a functional configuration of the RFID circuit element To for producing a label or acquiring information. In FIG. 8, the RFID circuit element To for producing a label or acquiring information has the loop antenna 152 for transmitting/receiving a signal contactlessly with the loop antennas LC1, LC2 on the side of the apparatus 1 for producing RFID labels by electromagnetic induction and the IC circuit part 151 connected to the loop antenna 152. The tag antenna may use a dipole antenna instead of the loop antenna 152. In this case, the dipole antenna is provided as the antenna on the side of the apparatus 1 for producing RFID labels instead of the loop antennas LC1, LC2, respectively, and information transmission and reception is performed by electric-wave communication using an electric field. All the shielding member in the specification of the present application (the above first shielding member or the second and third shielding member in a variation, which will be described later), the above first to third metal portions and the conductive paint and the like have a function to shield or attenuate the electromagnetic wave. That is, a communication signal can be shielded or attenuated against either of the communication by electromagnetic induction and the electric-wave communication.

The IC circuit part 151 includes a rectification part 153 that rectifies the interrogating wave received by the loop antenna 152, a power source part 154 that accumulates energy of the interrogating wave rectified by the rectification part 153 so as to make it a driving power supply, a clock extraction part 156 that extracts a clock signal from the interrogating wave received by the loop antenna 152 so as to supply it to a control part 155, a memory part 157 which can store a predetermined information signal, a modem part 158 connected to the loop antenna 152, and the control part 155 for controlling operation of the RFID circuit element To through the rectification part 153, the clock extraction part 156, the modem part 158 and the like.

The modem part 158 demodulates a communication signal from the loop antennas LC1, LC2 of the apparatus 1 for producing RFID labels received by the loop antenna 152 and modulates and reflects the interrogating wave received at the loop antenna 152 to reply as a response wave from the loop antenna 152 based on the response signal from the control part 155.

The control part 155 interprets a received signal demodulated by the modem part 158, generates a reply signal based on the information signal stored in the memory part 157, and executes basic control such as control of reply by the modem part 158.

FIGS. 9A and 9B are views illustrating an example of the appearance of the RFID label T formed after information writing (or reading) of the RFID circuit element To for producing a label and cutting of the tag label tape 109 with print by the apparatus 1 for producing RFID labels configured as above have been finished, in which FIG. 9A is a top view and FIG. 9B is a bottom view. FIG. 10A is a diagram obtained by rotating a cross sectional diagram of the XA-XA' section in FIG. 9A counterclockwise by 90 degrees, and FIG. 10B is a diagram obtained by rotating a cross sectional diagram of the XB-XB' section in FIG. 9A counterclockwise by 90 degrees.

In FIGS. 9A and 9B, and FIGS. 10A and 10B, the RFID label T is in the five-layered structure in which the cover film 103 is added to the four-layered structure shown in FIG. 6 as mentioned above made of four layers of the cover film 103, the adhesive layer 101a, the base film 101b, the adhesive layer 101c, and the separation sheet 101d from the cover film 103 side (upper side in FIG. 10) to the opposite side (lower side in FIG. 10). The RFID circuit element To for producing a label including the loop antenna 152 provided on the back side of the base film 101b as mentioned above is provided in the base film 101b and the adhesive layer 101c, and the label print R (characters of "RF-ID" representing the type of the RFID label T in this embodiment) corresponding to the stored information or the like of the RFID circuit element To for producing a label is printed on the back face of the cover film 103.

Also, in the cover film 103, the adhesive layer 101a, the base film 101b, and the adhesive layer 101c, a half-cut line HC (half-cut portion. Two lines of a front half-cut line HC1 and a rear half-cut line HC2, which will be described later, in this embodiment) are formed by the half cutter 34 substantially along the tape width direction as mentioned above. In the cover film 103, a portion between the half-cut lines HC1, HC2 becomes a print area S on which the label print R is printed, while the both sides in the tape longitudinal direction from the print area S with the half-cut lines HC1, HC2 between them is a front margin area S1 and a rear margin area S2.

In the apparatus 1 for producing RFID labels with the above basic configuration, a label production processing for producing the RFID label T and the information acquisition processing for reading (acquiring) information from a RFID circuit element for acquiring information outside the apparatus 1 can be executed using the RFID circuit element To for producing a label in the housing 200. That is, in the label production processing, the base tape 101 provided with the RFID circuit element To for producing a label (tag label tape 109 with print) is fed by the feeding roller 27, information transmission and reception is performed with the RFID circuit element To for producing a label through the loop antenna LC1 for producing a label so that predetermined information is written, and the tag label tape 109 with print is cut so that the RFID label T is produced. On the other hand, in the information acquisition processing, the information transmission/receiving is performed with the RFID circuit element To for acquiring information located outside the housing 200 through the loop antenna LC2 for acquiring information so that the predetermined RFID tag information is readout and acquired. As mentioned above, using the single apparatus 1 for producing RFID labels, both the tag label production processing and information reading (acquiring) processing can be done, apparatus configuration can be simplified and cost bearing by users can be reduced as compared with separate preparation of both a label producing apparatus and an information reading apparatus.

In correspondence with different communications realized by the two antennas LC1, LC2, in the apparatus 1 for producing RFID labels, the shielding member 85 is provided so as to cover the loop antenna LC1 for producing a label on the side of the loop antenna LC2 for acquiring information. By this arrangement, even if the RFID circuit element for acquiring information is placed in the vicinity of the loop antenna LC2 for acquiring information in label production using the loop antenna LC1 for producing a label, a magnetic field from the loop antenna LC1 for producing a label toward the RFID circuit element for acquiring information (electric wave when the above-mentioned dipole antenna is used. The same applies to the following) can be shielded (or attenuated) by the shielding member 85. As a result, in communication between the loop antenna LC1 for producing a label and the RFID circuit element To for producing a label, occurrence of communication interference or communication jamming can be prevented and communication stability and reliability can be improved.

On the contrary, the magnetic field from the loop antenna LC2 for acquiring information toward the loop antenna LC2 for a producing label, that is, inside the housing 200 can be similarly shielded (or attenuated). As a result, occurrence of miscommunication from the loop antenna LC1 for producing a label toward the RFID circuit element To for producing a label held in the housing 200 in a label production can be also prevented.

Also, the communication between the loop antenna LC1 for producing a label and the RFID circuit element To for producing a label in the label production usually has a relatively short communication distance and the transmission output is relatively large (the antenna is also small-sized. See FIG. 5). On the other hand, the communication between the loop antenna LC2 for acquiring information and the RFID circuit element To for acquiring information has a relatively long communication distance and the transmission output is relatively large (the size of the antenna is also large. See FIG. 5). Then, particularly in this embodiment, by setting $L1 \leq L2$ as mentioned above, the shielding member 85 is arranged closer to (or at the same distance from) the loop antenna LC1 for producing a label rather than the loop antenna LC2 for acquiring information. By this arrangement, the magnetic field from the loop antenna LC1 for producing a label toward the loop antenna LC2 for acquiring information can be surely shielded (or attenuated).

Particularly if the loop antenna LC1 for producing a label, which is a coil antenna as above, is used for communication with the RFID circuit element To for producing a label by magnetic coupling (or electromagnetic induction), the closer to the antenna is arranged the shielding member 85, the further enhanced is a magnetic-flux shielding function, which is effective. In this case, instead of (or together with) setting at $L1 \leq L2$ as above, an appropriate magnetic body may be provided between the shielding member 85 and the loop antenna LC2 for acquiring information. That is, by providing the magnetic body, a magnetic flux passes through the magnetic body and it has the same effect as can be obtained when the distance L2 between the shielding member 85 and the loop antenna LC2 for acquiring information is increased. That is, the magnetic field from the loop antenna LC1 for producing a label toward the loop antenna LC2 for acquiring information can be surely shielded (or attenuated).

Particularly in this embodiment, the magnetic field passing through the vicinity of the print head 23 and the head mounting portion 24 can be shielded (or attenuated) by the first metal portion provided at the head mounting portion 24. As a result, the magnetic field flowing into the RFID circuit element To for producing a label stored in the cartridge 100 from outside the cartridge 100 can be reduced and miscommunication can be prevented.

Particularly in this embodiment, the magnetic field passing through the vicinity of the cutting mechanism 15 can be shielded (or attenuated) by the second metal potion provided at the movable blade 41 or the fixed blade 40. As a result, the magnetic field flowing from outside the cartridge 100 into the RFID circuit element To for producing a label stored in the cartridge 100 along the feeding path of the tag label tape 109 with print can be reduced and miscommunication can be prevented.

Also, particularly in this embodiment, the magnetic field passing through the vicinity of the half-cut unit 35 can be shielded (or attenuated) by the third metal portion provided at the half cutter 34. As a result, the magnetic field flowing from outside the cartridge 100 into the RFID circuit element To for producing a label stored in the cartridge 100 along the feeding path of the tag label tape 109 with print can be reduced and miscommunication can be prevented.

The present invention is not limited to the above embodiment but various variations are possible in a scope not departing from the gist and technical idea and such variations will be described below.

(1) When another shielding member is provided on the side opposite the shielding member 85 from the feeding path:

FIG. 11 is a perspective explanatory view illustrating a configuration of the internal unit 20 inside an apparatus for producing RFID labels according to this variation and corresponds to FIG. 3. FIG. 12 is plan view illustrating the configuration of the internal unit 20 and corresponds to FIG. 4.

In FIGS. 11 and 12, in this variation, a shielding member 88 (second shielding member) provided with a function to shield or attenuate a magnetic field similarly to the shielding member 85 is provided on a wall face portion (side wall face) 200b or its vicinity on the side opposite the loop antenna LC2 for acquiring information from the loop antenna LC1 for producing a label in the housing 200.

In this variation, the magnetic field from the loop antenna LC1 for producing a label toward the outside of the housing 200 through the wall face portion 200b can be shielded (or attenuated) by the shielding member 88. As a result, in a label production, the magnetic field leaking from the loop antenna LC1 for producing a label toward the outside of the housing 200 through the above path can be reduced.

(2) When a shielding member is provided also on the side of the carry-out exit:

FIG. 13 is a plan view illustrating a configuration of the internal unit 20 inside an apparatus for producing RFID labels according to this variation and corresponds to FIG. 4.

In FIG. 13, in this variation, conductive paint portions 94a, 94b (third shielding member) provided with a function to shield or attenuate the magnetic field are provided on the label-discharge-side wall face portion (front wall 11 and the front lid 12) or its vicinity in the housing 200 similarly to the shielding members 85, 88. As the conductive paint, similarly to the above, solvent conductive silver, nickel, silver-plated copper, black lead, copper paints, aqueous conductive black lead, silver, silver-plated copper paint or the like may be used as appropriate (it is applied on the inner side on the discharge-side wall face portion in this example). In this example, the conductive paint is used but a member made of metal (iron, aluminum or the like) maybe provided similarly to the shielding members 85, 88.

According to this variation, the magnetic field from the loop antenna LC1 for producing a label toward outside the housing 200 through the discharge-side wall face portions 11, 12 can be shielded (or attenuated). As a result, in a label production, the magnetic field leaking from the loop antenna LC1 for producing a label to the outside of the housing 200 via the above path can be reduced.

(3) When a shield plate with the size equal to or larger than the antenna LC2 is provided:

FIG. 14 is a perspective explanatory view illustrating a configuration of the internal unit 20 inside an apparatus for producing RFID labels according to this variation and corresponds to FIG. 3. FIG. 15 is a plan view illustrating a configuration of the internal unit 20 and corresponds to FIG. 4.

In FIGS. 14 and 15, in this variation, a large-sized shielding member 85' with the size at least covering the loop antenna LC1 for producing a label of the loop antenna LC2 for acquiring information is provided instead of the shielding member 85 in the first embodiment as the first shielding member.

As mentioned above, unlike the communication between the loop antenna LC1 for producing a label and the RFID circuit label To for producing a label, communication between the loop antenna LC2 for acquiring information and the RFID circuit element To for acquiring information has a relatively long communication distance and the transmission output is relatively large. In this variation, corresponding to that, by providing the shielding member 85' with the size that can cover the loop antenna LC1 for producing a label of the loop antenna LC2 for acquiring information, the magnetic field from the loop antenna LC2 for acquiring information toward the loop antenna LC1 for producing a label can be surely shielded (or attenuated).

(4) When the position of the antenna LC1 is on the opposite side of the feeding path:

FIG. 16 is a plan view illustrating a configuration of the internal unit 20 of an apparatus for producing RFID labels according to this variation and corresponds to FIG. 4.

In FIG. 16, in this variation, the loop antenna LC1 for producing a label is provided on the opposite side (side of the driving roller 51) with the feeding path for the tag label tape 109 with print between them, by which information is transmitted/received with the RFID circuit element To for producing a label. The other points are the same as the above embodiment including the point that the shielding member 85 is provided.

In this variation, too, the same effect as that in the embodiment can be obtained.

(5) Others

In the above, a case where the RFID tag information is transmitted to the RFID circuit element To for producing a label and written in the IC circuit part 151 so as to produce the RFID label T has been described but not limited to that. That is, the present invention can be applied to a case where the RFID tag information is read out from the read-only RFID circuit element To for producing a label in which predetermined RFID tag information is unrewritably stored and held in advance while corresponding print is made so as to produce the RFID label T, and the same effect as above can be also obtained.

Also, in the above, print is made on the cover film 103 separate from the base tape 101 as the tag medium provided with the RFID circuit element To for producing a label and they are bonded together, but not limited to that, and the present invention may be applied to a method that the print is made on a print region in a print-receiving layer (thermal layer, transfer layer, image receiving layer) provided at a tag tape (tag medium), for example. In this case, too, the same effect can be obtained.

Also, in the above, a case where the tag label tape 109 with print on which print and access (reading or writing) to the RFID circuit element To for producing a label have been finished is cut by the cutting mechanism 15 so as to produce the RFID label T has been described but not limited to that. That is, if a label mount (so-called die-cut label) separated in advance into a predetermined size corresponding to a label is continuously arranged on a tape to be fed out from a roll, there is no need of cutting by the cutting mechanism 15 but only the label mount (the one provided with the RFID circuit element To for producing a label which has been accessed and given corresponding print) may be separated from the tape after the tape is discharged from the label carry-out exit 11 so as to produce the RFID label T, and the present invention can be also applied to this case.

Moreover, a case where the RFID label T with print is produced using the tag label tape 109 with print has been described but not limited to that, the present invention may be applied to those for producing the RFID label T without print.

Other than those mentioned above, methods according to the above embodiments and variations may be appropriately combined for use.

Though not specifically exemplified, the present invention should be put into practice with various changes made in a range not departing from its gist.

What is claimed is:

1. An apparatus for producing RFID labels comprising:
    a housing forming a shell of the apparatus;
    a cartridge holder configured to receive a cartridge, wherein the cartridge is configured to removably attach to the cartridge holder and is configured to supply a tag tape provided with an RFID circuit element having an IC circuit part configured to store information and a tag antenna configured to transmit and receive information;
    a feeding device configured to feed said tag tape supplied from said cartridge;
    a printing device configured to perform printing on said tag tape or on a print-receiving type bonded to said tag tape;
    a cutting device positioned on a feeding path of said tag tape and configured to cut the applied tag tape;
    a producing antenna configured to transmit and receive information to and from said RFID circuit element of said tag tape in a communication area inside said housing;
    an acquiring antenna configure to transmit and receive information to and from said RFID circuit element of said tag tape in a communication area outside said housing; and
    a first shielding member configured to shield or attenuate an electromagnetic wave,
    wherein said cartridge holder, said printing device, and said acquiring antenna are positioned in a first area at an upstream side of said feeding path inside said housing, and said cartridge holder, said printing device and said acquiring antenna are arranged in this order along a particular direction substantially perpendicular to said feeding path,
    wherein said cutting device, said producing antenna, and said first shielding member are positioned in a second area at a downstream side of said feeding path inside said housing, and said cutting device, said producing antenna, and said first shielding member are arranged in this order along the particular direction, and
    wherein said first shielding member is arranged to divide said second area into a side of said producing antenna and a side of said acquiring antenna.

2. The apparatus for producing RFID labels according to claim 1, further comprising a metal frame that is grounded,
    wherein said cartridge holder, said printing device, said metal frame, and said acquiring antenna are positioned in said first area and are arranged in this order along said particular direction.

* * * * *